United States Patent
Bazzarella et al.

(10) Patent No.: US 11,942,654 B2
(45) Date of Patent: Mar. 26, 2024

(54) DUAL ELECTROLYTE ELECTROCHEMICAL CELLS, SYSTEMS, AND METHODS OF MANUFACTURING THE SAME

(71) Applicant: 24M Technologies, Inc., Cambridge, MA (US)

(72) Inventors: Ricardo Bazzarella, Woburn, MA (US); Junzheng Chen, Concord, MA (US)

(73) Assignee: 24M Technologies, Inc., Cambridge, MA (US)

( * ) Notice: Subject to any disclaimer, the term of this patent is extended or adjusted under 35 U.S.C. 154(b) by 0 days.

(21) Appl. No.: 18/120,029

(22) Filed: Mar. 10, 2023

(65) Prior Publication Data
US 2023/0369719 A1 Nov. 16, 2023

Related U.S. Application Data

(63) Continuation of application No. 16/913,734, filed on Jun. 26, 2020, now Pat. No. 11,631,920.
(Continued)

(51) Int. Cl.
*H01M 50/30* (2021.01)
*H01M 10/0587* (2010.01)
(Continued)

(52) U.S. Cl.
CPC ..... *H01M 50/394* (2021.01); *H01M 10/0587* (2013.01); *H01M 50/183* (2021.01); *H01M 50/20* (2021.01); *H01M 50/502* (2021.01)

(58) Field of Classification Search
CPC ............ H01M 50/394; H01M 50/502; H01M 50/183; H01M 50/20; H01M 10/0587
See application file for complete search history.

(56) References Cited

U.S. PATENT DOCUMENTS 7,682,735 B2 * 3/2010 Lee ................. H01M 50/55
429/176
8,722,226 B2 5/2014 Chiang et al.
(Continued)

FOREIGN PATENT DOCUMENTS

CN 1489229 A 4/2004
CN 102544413 A 7/2012
(Continued)

OTHER PUBLICATIONS

Dolle, J., "Investigation of Si/C-based anodes for Li-Ion batteries," Berlin, 2014, 116 pages.
(Continued)

*Primary Examiner* — Matthew T Martin
*Assistant Examiner* — Paul Christian St Wyrough
(74) *Attorney, Agent, or Firm* — COOLEY LLP

(57) ABSTRACT

Embodiments described herein relate generally to electrochemical cells having dual electrolytes, systems of such electrochemical cells, and methods for manufacturing the same. In some embodiments, electrochemical cells can include a cathode disposed on a cathode current collector, an anode disposed on an anode current collector, and a separator disposed therebetween. In some embodiments, the separator can include materials that fluidically and/or chemically isolate the anode from the cathode. In some embodiments, the cathode and/or anode can include a slurry of an active material and a conductive material in a liquid electrolyte. In some embodiments, the anode can be fluidically coupled to an anode degassing port. In some embodiments, the cathode can be fluidically coupled to a cathode degassing port.

22 Claims, 11 Drawing Sheets

Related U.S. Application Data

(60) Provisional application No. 62/867,306, filed on Jun. 27, 2019.

(51) Int. Cl.
    *H01M 50/183*     (2021.01)
    *H01M 50/20*     (2021.01)
    *H01M 50/502*     (2021.01)

(56) References Cited

U.S. PATENT DOCUMENTS

| | | |
|---|---|---|
| 8,722,227 B2 | 5/2014 | Chiang et al. |
| 8,778,552 B2 | 7/2014 | Chiang et al. |
| 8,993,159 B2 | 3/2015 | Chiang et al. |
| 9,130,198 B2 | 9/2015 | Visco et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,734,672 B2 | 8/2020 | Chen et al. |
| 10,777,852 B2 | 9/2020 | Woodford et al. |
| 10,854,869 B2 | 12/2020 | Bazzarella et al. |
| 10,886,521 B2 | 1/2021 | Zagars et al. |
| 10,910,858 B2 | 2/2021 | Taylor et al. |
| 10,957,940 B2 | 3/2021 | Tan et al. |
| 10,964,973 B2 | 3/2021 | Tan et al. |
| 11,005,087 B2 | 5/2021 | Ota et al. |
| 11,018,365 B2 | 5/2021 | Chiang et al. |
| 11,024,903 B2 | 6/2021 | Ota et al. |
| 11,094,487 B2 | 8/2021 | Lawrence et al. |
| 11,094,976 B2 | 8/2021 | Chiang et al. |
| 11,121,437 B2 | 9/2021 | Bazzarella et al. |
| 11,139,467 B2 | 10/2021 | Zagars et al. |
| 11,145,909 B2 | 10/2021 | Chiang et al. |
| 11,309,531 B2 | 4/2022 | Slocum et al. |
| 11,342,567 B2 | 5/2022 | Chiang et al. |
| 11,462,722 B2 | 10/2022 | Aranami et al. |
| 11,469,065 B2 | 10/2022 | Lawrence et al. |
| 11,476,551 B2 | 10/2022 | Tyler et al. |
| 11,552,368 B2 | 1/2023 | Holman et al. |
| 11,575,146 B2 | 2/2023 | Taylor et al. |
| 11,594,793 B2 | 2/2023 | Bazzarella et al. |
| 11,611,061 B2 | 3/2023 | Zagars et al. |
| 11,631,920 B2 | 4/2023 | Bazzarella et al. |
| 11,646,437 B2 | 5/2023 | Bazzarella et al. |
| 11,652,203 B2 | 5/2023 | Zagars et al. |
| 2007/0020524 A1 | 1/2007 | Kim et al. |
| 2008/0268327 A1 | 10/2008 | Gordon et al. |
| 2010/0047671 A1 | 2/2010 | Chiang et al. |
| 2010/0323264 A1 | 12/2010 | Chiang et al. |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2012/0164499 A1 | 6/2012 | Chiang et al. |
| 2012/0164513 A1 | 6/2012 | Peng et al. |
| 2012/0177998 A1 | 7/2012 | Ogawa et al. |
| 2013/0055559 A1 | 3/2013 | Slocum et al. |
| 2013/0065122 A1 | 3/2013 | Chiang et al. |
| 2013/0183546 A1 | 7/2013 | Joshi et al. |
| 2013/0236766 A1 | 9/2013 | Seo et al. |
| 2013/0244082 A1 | 9/2013 | Lee et al. |
| 2013/0309547 A1 | 11/2013 | Bazzarella et al. |
| 2013/0337319 A1 | 12/2013 | Doherty et al. |
| 2013/0344367 A1 | 12/2013 | Chiang et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0154546 A1 | 6/2014 | Carter et al. |
| 2014/0170524 A1 | 6/2014 | Chiang et al. |
| 2014/0199577 A1 | 7/2014 | Bhavaraju |
| 2014/0248521 A1 | 9/2014 | Chiang et al. |
| 2014/0315097 A1 | 10/2014 | Tan et al. |
| 2014/0356654 A1 | 12/2014 | Bhavaraju |
| 2015/0024279 A1 | 1/2015 | Tan et al. |
| 2015/0129081 A1 | 5/2015 | Chiang et al. |
| 2015/0140371 A1 | 5/2015 | Slocum |
| 2015/0155592 A1 | 6/2015 | Pratt |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0036107 A1* | 2/2016 | Takechi ............... H01M 50/434 429/405 |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0181606 A1 | 6/2016 | Suga et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0005367 A1 | 1/2017 | Van Berkel et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0187018 A1 | 6/2017 | Pflueger et al. |
| 2017/0214034 A1 | 7/2017 | Ota et al. |
| 2017/0214084 A1 | 7/2017 | Cheng et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2017/0338522 A1 | 11/2017 | Hu et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0064277 A1 | 2/2019 | Cai et al. |
| 2019/0245242 A1 | 8/2019 | Tan et al. |
| 2019/0319239 A1 | 10/2019 | Zhou |
| 2019/0319460 A1 | 10/2019 | Taylor et al. |
| 2019/0326562 A1 | 10/2019 | Ota et al. |
| 2019/0348705 A1 | 11/2019 | Chen et al. |

(56) References Cited

U.S. PATENT DOCUMENTS

| | | | |
|---|---|---|---|
| 2019/0355998 | A1 | 11/2019 | Chiang et al. |
| 2019/0363351 | A1 | 11/2019 | Ota et al. |
| 2019/0393477 | A1 | 12/2019 | Lawrence et al. |
| 2020/0014025 | A1 | 1/2020 | Zagars et al. |
| 2020/0028178 | A1 | 1/2020 | He et al. |
| 2020/0044296 | A1 | 2/2020 | Chiang et al. |
| 2020/0067075 | A1 | 2/2020 | Choi et al. |
| 2020/0106094 | A1 | 4/2020 | Ota et al. |
| 2020/0161688 | A1 | 5/2020 | Chiang et al. |
| 2020/0220118 | A1 | 7/2020 | Bazzarella et al. |
| 2020/0220204 | A1 | 7/2020 | Tan et al. |
| 2020/0259338 | A1 | 8/2020 | Taylor et al. |
| 2020/0321597 | A1 | 10/2020 | Zagars et al. |
| 2020/0321601 | A1 | 10/2020 | Slocum et al. |
| 2020/0358129 | A1 | 11/2020 | Chen et al. |
| 2020/0411825 | A1 | 12/2020 | Bazzarella et al. |
| 2021/0091366 | A1 | 3/2021 | Bazzarella et al. |
| 2021/0167351 | A1 | 6/2021 | Zagars et al. |
| 2021/0226192 | A1 | 7/2021 | Aranami et al. |
| 2021/0249695 | A1 | 8/2021 | Aranami et al. |
| 2021/0265631 | A1 | 8/2021 | Chen et al. |
| 2022/0029207 | A1 | 1/2022 | Chiang et al. |
| 2023/0018078 | A1 | 1/2023 | Slocum et al. |
| 2023/0085181 | A1 | 3/2023 | Tan et al. |
| 2023/0090853 | A1 | 3/2023 | Tyler et al. |
| 2023/0133464 | A1 | 5/2023 | Ota et al. |
| 2023/0170169 | A1 | 6/2023 | Lawrence et al. |
| 2023/0178707 | A1 | 6/2023 | Aranami et al. |
| 2023/0238562 | A1 | 7/2023 | Kusachi et al. |

FOREIGN PATENT DOCUMENTS

| | | |
|---|---|---|
| CN | 102576909 A | 7/2012 |
| CN | 102646801 A | 8/2012 |
| CN | 103493253 A | 1/2014 |
| CN | 103746089 A | 4/2014 |
| CN | 104269508 A | 1/2015 |
| CN | 104538577 A | 4/2015 |
| CN | 106159312 A | 11/2016 |
| CN | 107069148 A | 8/2017 |
| CN | 107112594 A | 8/2017 |
| CN | 206849967 U | 1/2018 |
| EP | 3386008 B1 | 4/2020 |
| JP | 2011081931 A | 4/2011 |
| KR | 20200000334 A | 1/2020 |
| KR | 102111310 B1 | 5/2020 |
| WO | WO-2004027901 A2 | 4/2004 |
| WO | WO-2018084431 A1 | 5/2018 |
| WO | WO-2022094466 A1 | 5/2022 |

OTHER PUBLICATIONS

Extended European Search Report for European Application No. 19735808.8, dated Sep. 13, 2021, 8 pages.
Final Office Action for U.S. Appl. No. 16/913,734, dated Jul. 18, 2022, 17 pages.
Hatzell et al., "Materials for suspension (semi-solid) electrodes for energy and water technologies", Chemical Society Reviews, Sep. 28, 2015, vol. 44(23), pp. 8664-8687, XP055459247.
International Preliminary Report on Patentability for International Application No. PCT/US2021/038921 dated Jan. 5, 2023, 14 pages.
International Preliminary Report on Patentability for International Application No. PCT/US2021/057727 dated May 11, 2023, 18 pages.
International Search Report and Written Opinion for International Application No. PCT/US2019/012750, dated May 16, 2019, 12 pages.
International Search Report and Written Opinion for International Application No. PCT/US2021/038921, dated Nov. 29, 2021, 19 pages.
International Search Report and Written Opinion for International Application No. PCT/US2021/057727, dated Apr. 19, 2022, 24 pages.
Invitation to Pay Additional Fees for International Application No. PCT/US2021/057727 dated Feb. 25, 2022, 20 pages.
Non Final Office Action for U.S. Appl. No. 16/907,762, dated Jun. 2, 2022, 19 pages.
Non-Final Office Action for U.S. Appl. No. 16/907,762 dated May 30, 2023, 15 pages.
Non-Final Office Action for U.S. Appl. No. 16/913,734 dated Jan. 13, 2022, 16 pages.
Non-Final Office Action for U.S. Appl. No. 16/913,734 dated Oct. 18, 2021, 6 pages.
Notice of Allowance for U.S. Appl. No. 16/913,734, dated Dec. 12, 2022, 8 pages.
Office Action for Chinese Application No. CN201980012824 dated Feb. 23, 2023, 16 pages.
Office Action for U.S. Appl. No. 16/242,849, dated Feb. 10, 2020, 20 pages.
Office Action for U.S. Appl. No. 16/242,849, dated Oct. 2, 2019, 21 pages.
Partial International Search Report for International Application No. PCT/US2021/057727, dated Feb. 25, 2022, 4 pages.
Search Report for Chinese Application CN201980012824.1, dated Aug. 3, 2022, 29 pages.
Office Action for Chinese Application No. CN20198012824 dated Jun. 10, 2023, 11 pages.
Office Action for European Application No. EP21820026 dated Jun. 12, 2023, 3 pages.
Sethuraman, V. A. et al., "In situ measurements of stress evolution in silicon thin films during electrochemical lithiation and delithiation," Journal of Power Sources, vol. 195, No. 15, Aug. 2010, pp. 5062-5066.

* cited by examiner

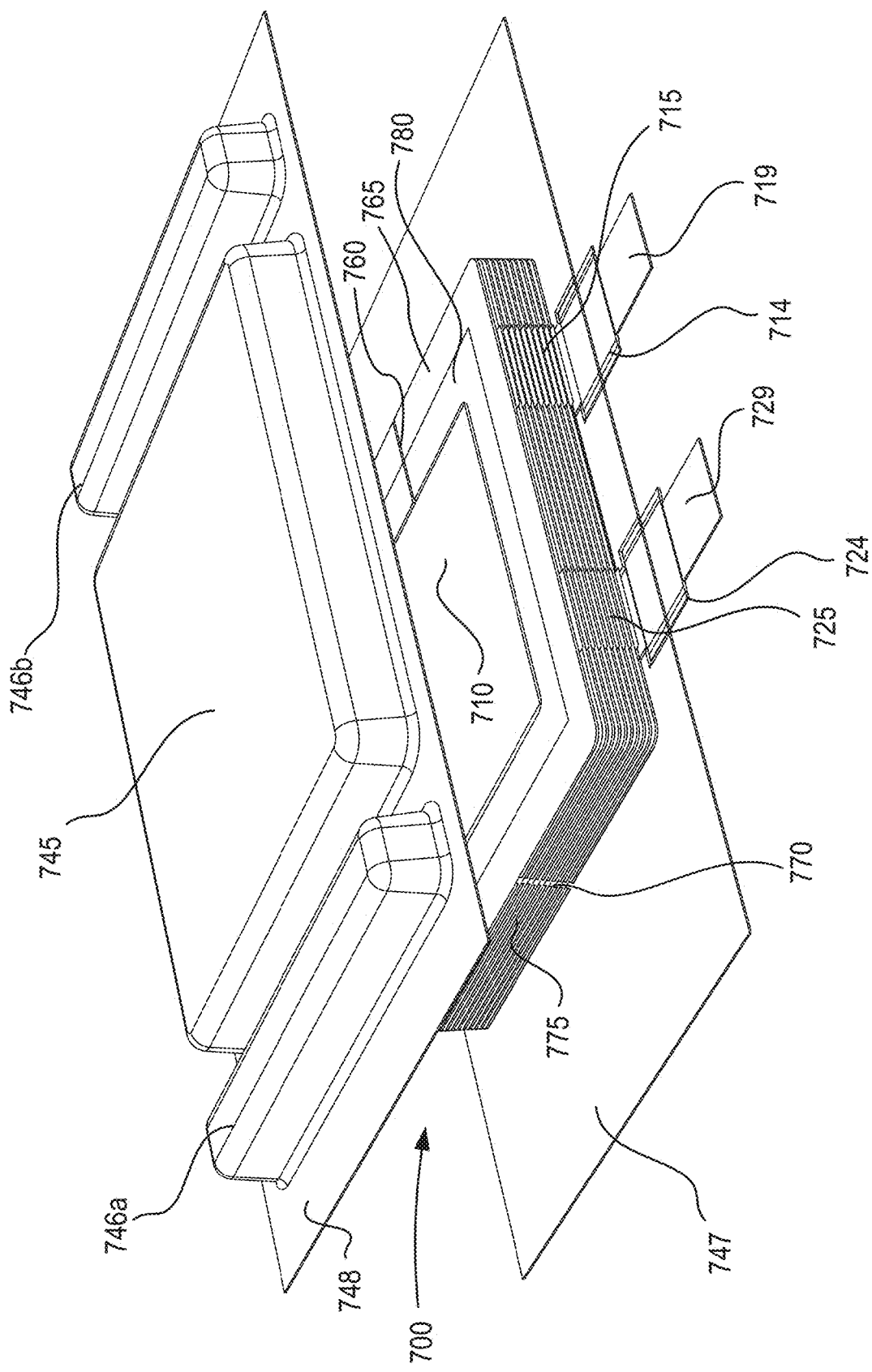

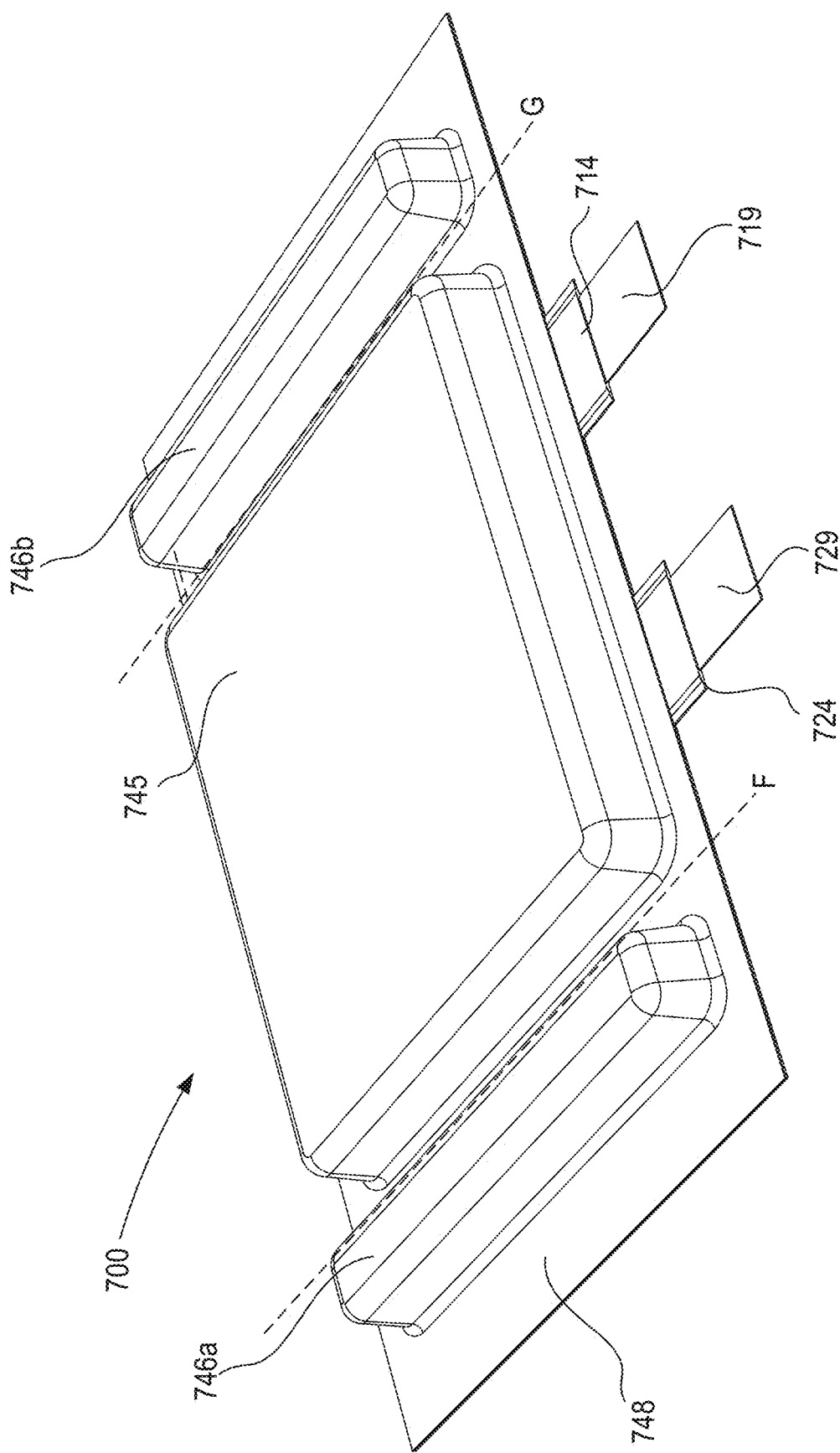

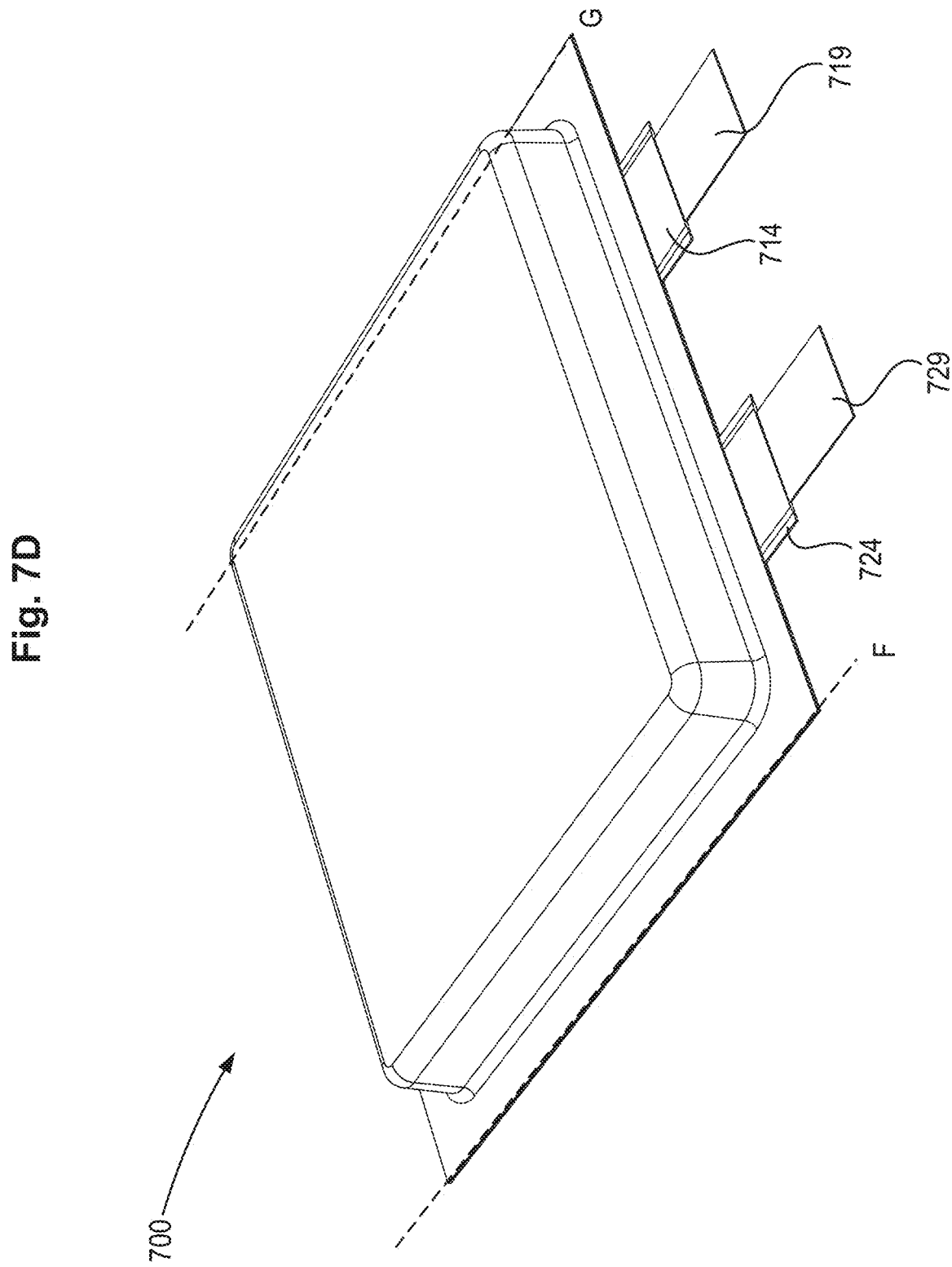

DUAL ELECTROLYTE ELECTROCHEMICAL CELLS, SYSTEMS, AND METHODS OF MANUFACTURING THE SAME

RELATED APPLICATIONS

This application is a continuation of U.S. patent application Ser. No. 16/913,734, filed Jun. 26, 2020 and entitled "Dual Electrolyte Electrochemical Cells, Systems, and Methods of Manufacturing the Same," which claims priority and benefit of U.S. Provisional Application No. 62/867,306, filed Jun. 27, 2019 and entitled "Dual Electrolyte Electrochemical Cells, Systems, and Methods of Manufacturing the Same," the entire disclosure of each of which is hereby incorporated by reference herein in its entirety.

BACKGROUND

Embodiments described herein relate generally to electrochemical cells having dual electrolytes and systems and methods for manufacturing the same. Batteries are typically constructed of an anode, a cathode, a separator, an electrolyte solution, and ancillary components such as, for example, packaging, thermal management, cell balancing, consolidation of electrical current carriers into terminals, and/or other such components. In a typical electrochemical cell, the separator electrically isolates the electrodes from one another. However, the separator does not typically fluidically isolate the electrodes from one another. In such a system, a single electrolyte moves between each electrode within the cell. Using a single electrolyte can lead to difficulty in optimizing the properties of the electrodes, as both electrodes have to be compatible with the electrolyte. An enduring challenge in the electrochemical cell industry is to create a robust electrochemical cell or a system of electrochemical cells, in which the electrodes remain in fluidic isolation from each other. Such a cell or system of cells can allow for independent optimization of the properties of each electrode.

SUMMARY

Embodiments described herein relate generally to electrochemical cells having dual electrolytes, systems of such electrochemical cells, and methods for manufacturing the same. In some embodiments, electrochemical cells can include a cathode disposed on a cathode current collector, an anode disposed on an anode current collector, and a separator disposed therebetween. In some embodiments, the cathode can include a slurry of an active material and a conductive material in a liquid catholyte. In some embodiments, the anode can include a slurry of an active material and a conductive material in a liquid anolyte. In some embodiments, the catholyte can be different from the anolyte. The electrochemical cell further includes a cathode degassing port configured to release gas built up in the cathode during manufacture, and an anode degassing port configured to release gas built up in the anode during manufacture. In some embodiments, the separator can include a solid-state electrolyte material. In some embodiments, the separator can fluidically isolate the anolyte from the catholyte, while still allowing the passage of ions between the anode and cathode.

BRIEF DESCRIPTION OF THE DRAWINGS

FIGS. 7A-7D illustrate a method of manufacturing a dual electrolyte electrochemical cell stack, according to an embodiment.

DETAILED DESCRIPTION

Figure 1:
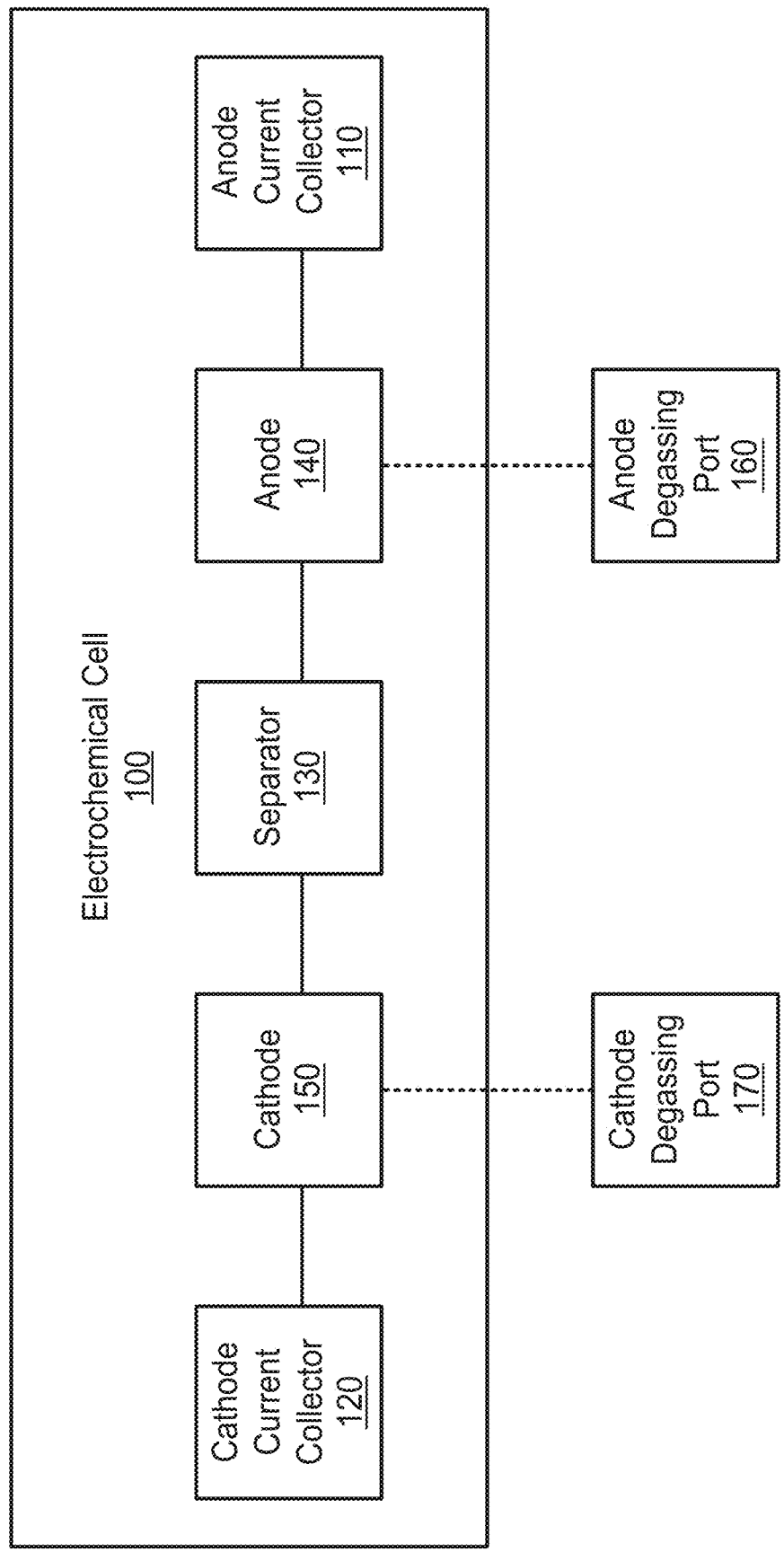
FIG. 1 is a schematic illustration of a dual electrolyte electrochemical cell, according to an embodiment.

Embodiments described herein relate generally to electrochemical cells having dual electrolytes, systems of such electrochemical cells, and methods for manufacturing the same. In some embodiments, an electrochemical cell includes a cathode disposed on a cathode current collector and fluidically coupled to a cathode degassing port configured to release gas built up in the cathode during manufacture, an anode disposed on an anode current collector and fluidically coupled to an anode degassing port configured to release gas built up in the anode during manufacture, and a separator disposed therebetween. In some embodiments, the cathode can include a slurry of an active material and a conductive material in a liquid catholyte. In some embodiments, the anode can include a slurry of an active material and a conductive material in a liquid anolyte. In some embodiments, the catholyte and the anolyte can be different. In some embodiments, the catholyte can be optimized to improve the performance of the redox electrochemistry and/or safety of the cathode and the anolyte can be optimized to improve the performance of the redox electrochemistry and/or safety of the anode. In some embodiments, the separator can fluidically isolate the catholyte from the anolyte. In some embodiments, the separator can extend substantially beyond the cathode and the anode. In some embodiments, a portion of the separator can be sealed between a cathode seal and an anode seal to fluidically isolate the cathode from the anode.

Conventional battery systems store electrochemical energy by separating an ion source and ion sink at differing ion electrochemical potential. A difference in electrochemical potential produces a voltage difference between the positive and negative electrodes, which produces an electric current if the electrodes are connected by a conductive element. Differences in electrochemical potential between the positive and negative electrodes may produce a higher voltage system, which contributes to higher energy density cells. In a conventional battery system, negative electrodes and positive electrodes are connected via a parallel configuration of two conductive elements. The external elements exclusively conduct electrons, however, the internal elements, being separated by a separator and electrolyte, exclusively conduct ions. The external and internal flow streams supply ions and electrons at the same rate, as a charge imbalance cannot be sustained between the negative electrode and positive electrode. The produced electric current can be used to drive an external device. A rechargeable battery can be recharged by application of an opposing voltage difference that drives electric and ionic current in an opposite direction as that of a discharging battery. Accordingly, active material of a rechargeable battery can both accept and provide ions. Increased electrochemical potentials produce larger voltage differences between the cathode and anode of a battery, which increases the electrochemically stored energy per unit mass of the battery. For high-power batteries, the ionic sources and sinks are connected to a separator by an element with large ionic conductivity, and to the current collectors with high electric conductivity elements.

Typical battery manufacturing involves numerous complex and costly processes carried out in series. Each of these processes is subject to yield losses, incurs capital costs for equipment, and includes operating expenses for energy consumption and consumable materials. The manufacturing first involves making separate anodic and cathodic mixtures that are typically mixtures of electrochemically active ion storage compounds, electrically conductive additives, and polymer binders. The mixtures are coated onto the surfaces of flexible metal foils and subsequently compressed under high pressure to increase density and control thickness. These compressed electrode/foil composites are then slit into sizes and/or shapes that are appropriate for the particular form factor of the manufactured battery. The slit electrode composites are typically co-wound or co-stacked with intervening ionically-conductive/electronically-insulating separator membranes to construct battery windings, i.e., "jelly rolls" or "stacks," which are then packaged in metal cans, flexible polymer pouches, etc. The resulting cells can be infiltrated with liquid electrolyte that can be introduced in a carefully controlled environment, e.g., a high vacuum environment.

The stored energy or charge capacity of a manufactured battery is related to the inherent charge capacity of the active materials (mAh/g), the volume of the electrodes ($cm^3$), the product of the thickness, area, and number of layers, and the loading of active material in the electrode media (e.g., grams of active material/cubic centimeters of electrode media). Therefore, to enhance commercial appeal (e.g., increased energy density and decreased cost), it is generally desirable to increase areal charge capacity ($mAh/cm^2$) of the electrodes that are to be disposed in a given battery form factor, which depends on electrode thickness and active material loading. Moreover, it is desirable to increase electrical conduction between the current collector and the electrode material. For example, it can be desirable to increase the surface area of the current collector that is in physical and/or electrical connection with a semi-solid electrode material.

Conventional electrochemical cells typically include a porous membrane separator, e.g., a porous polyolefin membrane. Conventional separators typically have thicknesses from about 6 to about 32 μm with a weight of about 5 to about 20 g/m2, and a porosity of between about 38% and about 55%. Conventional separators can allow for the transfer of ionic charge carriers between the cathode and the anode, and can typically be wetted by the electrolyte and/or communicate the electrolyte between the anode side and the cathode side. Conventional separators provide electrical isolation between the anode and the cathode. Therefore, a single electrolyte is typically used for both the anode side and the cathode side of conventional electrochemical cells that is compatible with the anode, cathode, and current collector materials. In other words, for conventional electrochemical cells, a common electrolyte is chosen that is not optimized for either cathode electrochemistry or for anode electrochemistry. The fluidic communication of the electrolyte across conventional separators can lead to the chemical homogenization of electrolyte between the cathode and the anode, which limits the ability to tailor the catholyte and the anolyte materials for optimal electrochemical performance in the cathode and the anode, respectively.

Traditional solid-state electrodes are often made by sintering or pressing fully solid electrolytes and active material powders. However, the resulting electrodes typically do not have good interfacial contact between the electrolyte and the active material due to volumetric changes during battery operation. For traditional solid-state electrodes, a full mixture of the separator and active materials still cannot achieve optimal electrochemical contact. In addition, cracks often form in solid electrolytes during battery operation, e.g., due to temperature and/or volume changes. Therefore, one barrier to solid-state electrolyte commercialization has been the interfacial contact resistance. In other words, a separator and/or solid-state electrode can be highly resistant to remaining in contact with another separator/electrode due to chemical or physical interactions.

Traditional electrochemical cells also often use highly volatile and highly flammable solvents as part of the liquid electrolyte, which can increase the rate of solvent leaks, fire, and other electrochemical cell damage. Traditional solvent electrolytes, for example for lithium-ion batteries, often include a lithium-containing salt in solvents such as dimethyl carbonate, ethyl methyl carbonate, and/or diethyl carbonate. These solvents and salt combinations often lead to lithium dendrite formation, gas formation, and/or solid-electrolyte interphase (SEI) formation, which can lead to decreased energy density, decreased conductivity and rate capability, decreased cycle and calendar life, and/or explosion and fire risk. In order to stabilize the SEI layer and reduce reactivity, an electrolyte additive such as vinyl carbonate (VC) may be used, however these additives are typically compatible on the anode side but unstable on the cathode side.

Examples of electrochemical cells that include a separator with a selectively permeable membrane that can chemically and/or fluidically isolate the anode from the cathode while facilitating ion transfer during charge and discharge of the cell are described in U.S. patent application Ser. No. 16/242,849 entitled, "Electrochemical Cells Including Selectively Permeable Membranes, Systems and Methods of Manufacturing the Same," filed Jan. 8, 2019 ("the '849 application"), the disclosure of which is incorporated herein by reference in its entirety. In an electrochemical cell with chemical and/or fluidic isolation between the anode and the cathode, gas generated during the formation process can create unique challenges. For example, fluidic isolation between the anode and the cathode means that gas generated in the anode cannot be expelled through the cathode and vice versa. In other words, the degassing process typically cannot be carried out via a single degassing port. Therefore, an anode degassing port can be fluidically coupled to the anode and a cathode degassing port can be fluidically coupled to the cathode in order to remove generated gas from both sides of the selectively permeable membrane.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "about" and "approximately" generally mean plus or minus 10% of the value stated, e.g., about 250 µm would include 225 µm to 275 µm, about 1,000 µm would include 900 µm to 1,100 µm.

As used herein, the term "semi-solid" refers to a material that is a mixture of liquid and solid phases, for example, such as a particle suspension, a slurry, a colloidal suspension, an emulsion, a gel, or a micelle.

As used herein, the term "conventional separator" means an ion permeable membrane, film, or layer that provides electrical isolation between an anode and a cathode, while allowing charge carrying ions to pass therethrough. Conventional separators do not provide chemical and/or fluidic isolation of the anode and cathode.

FIG. 1 is a schematic illustration of an electrochemical cell 100, according to an embodiment. The electrochemical cell 100 includes an anode current collector 110, a cathode current collector 120, and a separator 130 disposed between the anode current collector 110 and the cathode current collector 120. An anode 140 is disposed between the anode current collector 110 and the separator 130, and a cathode 150 is disposed between the cathode current collector 120 and the separator 130. In some embodiments, the anode 140 can be fluidically coupled to an anode degassing port 160. In some embodiments, the cathode 150 can be fluidically coupled to a cathode degassing port 170. In some embodiments, the separator 130 can extend beyond the cathode 150 and the anode 140. In some embodiments, the edges of the separator 130 can be sealed between a cathode seal (not shown) and an anode seal (not shown).

In some embodiments, the anode degassing port 160 can be defined by a discontinuity in the anode seal. In some embodiments the cathode degassing port 170 can be defined by a discontinuity in the cathode seal. In some embodiments, the anode degassing port 160 can be defined by a degassing tail, or a capillary that extends through the width of the anode seal. In some embodiments, the cathode degassing port 170 can be defined by a degassing tail that extends through the width of the cathode seal. In some embodiments, the electrochemical cell 100 or a system of electrochemical cells can be contained within a pouch. In some embodiments, the degassing tails can be made of the same material as the pouch. In some embodiments, the degassing tails can be made of a different material from the pouch. In some embodiments, the degassing tails can have properties similar to those described in U.S. Patent Publication No. 2018/0233722 ("the '722 Publication"), the entire disclosure of which is hereby incorporated by reference herein. In some embodiments, the anode degassing port 160 and/or the cathode degassing port 170 can be defined by a channel disposed in the anode seal and/or cathode seal (e.g., drilled, machined). In some embodiments, the anode degassing port 160 and/or the cathode degassing port 170 (collectively referred to as "the degassing ports") can be defined by a path mechanically removed from the anode seal and/or cathode seal (e.g., drilled, machined).

In some embodiments, gases created in the anode 140 can be expelled through the anode degassing port 160. In some embodiments, gases created in the cathode 150 can be expelled through the cathode degassing port 170. In some embodiments, the anode 140 can be fluidically coupled to multiple anode degassing ports 160. In some embodiments, the anode 140 can be fluidically coupled to one, two, three, four, five, six, seven, eight, nine, ten, or more anode degassing ports 160. In some embodiments, the cathode 150 can be fluidically coupled to multiple cathode degassing ports 170. In some embodiments, the cathode 150 can be fluidically coupled to one, two, three, four, five, six, seven, eight, nine, ten, or more cathode degassing ports 170.

In some embodiments, the degassing ports can be in direct communication with the rest of the pouch. In some embodiments, the degassing ports can be separated from the rest of the pouch by a pressure regulating membrane. Excess gas pressure in the pouch can push open the pressure regulating membrane and release the gas into the degassing ports. In some embodiments, the boundary between the degassing ports and the rest of the pouch can be partially sealed. For example, a series of sealing points can be applied at the boundary between either of the degassing ports and the rest of the pouch.

In some embodiments, the cathode degassing port 170 can expel about 20% of the gas generated in the cathode 150. In some embodiments, the cathode degassing port 170 can expel about 30% of the gas generated in the cathode 150. In some embodiments, the cathode degassing port 170 can expel about 40% of the gas generated in the cathode 150. In some embodiments, the cathode degassing port 170 can to expel about 50% of the gas generated in the cathode 150. In some embodiments, the cathode degassing port 170 can expel about 60% of the gas generated in the cathode 150. In some embodiments, the cathode degassing port 170 can expel at least about 20%, at least about 30%, at least about 40%, or at least about 50% of the gas generated in the cathode 150. In some embodiments, the cathode degassing port 170 can expel no more than about 60%, no more than about 50%, no more than about 40%, or no more than about 30% of the gas generated in the cathode 150. Combinations of the above-referenced gas expulsions from the cathode 150 by the cathode degassing port 170 are also possible (e.g., at least about 20% and no more than about 60% or at least about 30% and no more than about 50%), inclusive of all values and ranges therebetween.

In some embodiments, the anode degassing port 160 can expel about 20% of the gas generated in the anode 140. In some embodiments, the anode degassing port 160 can expel about 30% of the gas generated in the anode 140. In some embodiments, the anode degassing port 160 can expel about 40% of the gas generated in the anode 140. In some embodiments, the anode degassing port 160 can to expel about 50% of the gas generated in the anode 140. In some embodiments, the anode degassing port 160 can expel about 60% of the gas generated in the anode 140. In some embodiments, the anode degassing port 160 can expel at least about 20%, at least about 30%, at least about 40%, or at least about 50% of the gas generated in the anode 140. In some embodiments, the anode degassing port 160 can expel no more than about 60%, no more than about 50%, no more than about 40%, or no more than about 30% of the gas generated in the anode 140. Combinations of the above-referenced gas expulsions from the anode 140 by the anode degassing port 160 are also possible (e.g., at least about 20% and no more than about 60% or at least about 30% and no more than about 50%), inclusive of all values and ranges therebetween.

Fluidic isolation between anode 140 and cathode 150 as described herein may result in increased safety and reduced leak potential for electrochemical cells. For instance, in some embodiments, gas production during formation of the battery and during the initial charge-discharge cycles can be distributed between the anode degassing port 160 and the cathode degassing port 170, rather than all gas being expelled through a single degassing port. In some embodiments, the electrochemical cells described herein can include a non-flammable solvent or a non-corrosive or high oxidation resistance electrolyte salt. In addition, in some embodiments, the electrochemical cells described herein may experience reduced solvent electrolyte leakage due to the use of semi-solid electrode materials and separators.

In some embodiments, the anode 140 and the cathode 150 (collectively referred to as "the electrodes" can include a semi-solid material. Examples of systems and methods that can be used for preparing the semi-solid compositions and/or electrodes are described in U.S. Pat. No. 9,484,569 (hereafter "the '569 Patent"), filed Mar. 15, 2013, entitled "Electrochemical Slurry Compositions and Methods for Preparing the Same," U.S. Pat. No. 8,993,159 (hereafter "the '159 Patent"), filed Apr. 29, 2013, entitled "Semi-Solid Electrodes Having High Rate Capability," and U.S. Patent Publication No. 2016/0133916 (hereafter "the '916 Publication"), filed Nov. 4, 2015, entitled "Electrochemical Cells Having Semi-Solid Electrodes and Methods of Manufacturing the Same," the entire disclosures of which are hereby incorporated by reference herein.

In some embodiments, the anode 140 and/or the cathode 150 can have properties similar to those described in the '159 Patent. For instance, the cathode 150 can be a semi-solid stationary cathode or a semi-solid flowable cathode, for example of the type used in redox flow cells. The cathode 150 can include an active material such as a lithium bearing compound as described in further detail below. The cathode 150 can also include a conductive material Such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls." graphene sheets and/or aggregate of graphene sheets, any other conductive material, alloys or combination thereof. The cathode 150 can also include a non-aqueous liquid electrolyte as described in further detail below.

In some embodiments, the anode current collector 110 and/or the cathode current collector 120 can have properties similar to those described in the '849 application. For instance, in some embodiments, the cathode current collector 120 can include a tab coupled to a positive lead. In some embodiments, the tab can be cut to a desired length for coupling with the positive lead. The positive lead can be a strip of a conducting metal (e.g., copper or aluminum) which can be coupled to the tab using any suitable method, for example, ultrasonic welding, clamping, crimping, adhesive tape, or combinations thereof. In some embodiments, the anode current collector 110 can also include a tab coupled to a negative lead. In some embodiments, the tab can be cut to a desired length for coupling with the negative lead. The negative lead can be substantially similar to the positive lead, and is not described in further detail herein.

In some embodiments, the separator 130 can include a selectively permeable membrane with additional properties as described in the '849 application. In some embodiments, the edges of the separator 130 can be sealed between an anode seal and a cathode seal to chemically and/or fluidically isolate the cathode 150 and catholyte and the anode 140 and anolyte.

Figure 2:
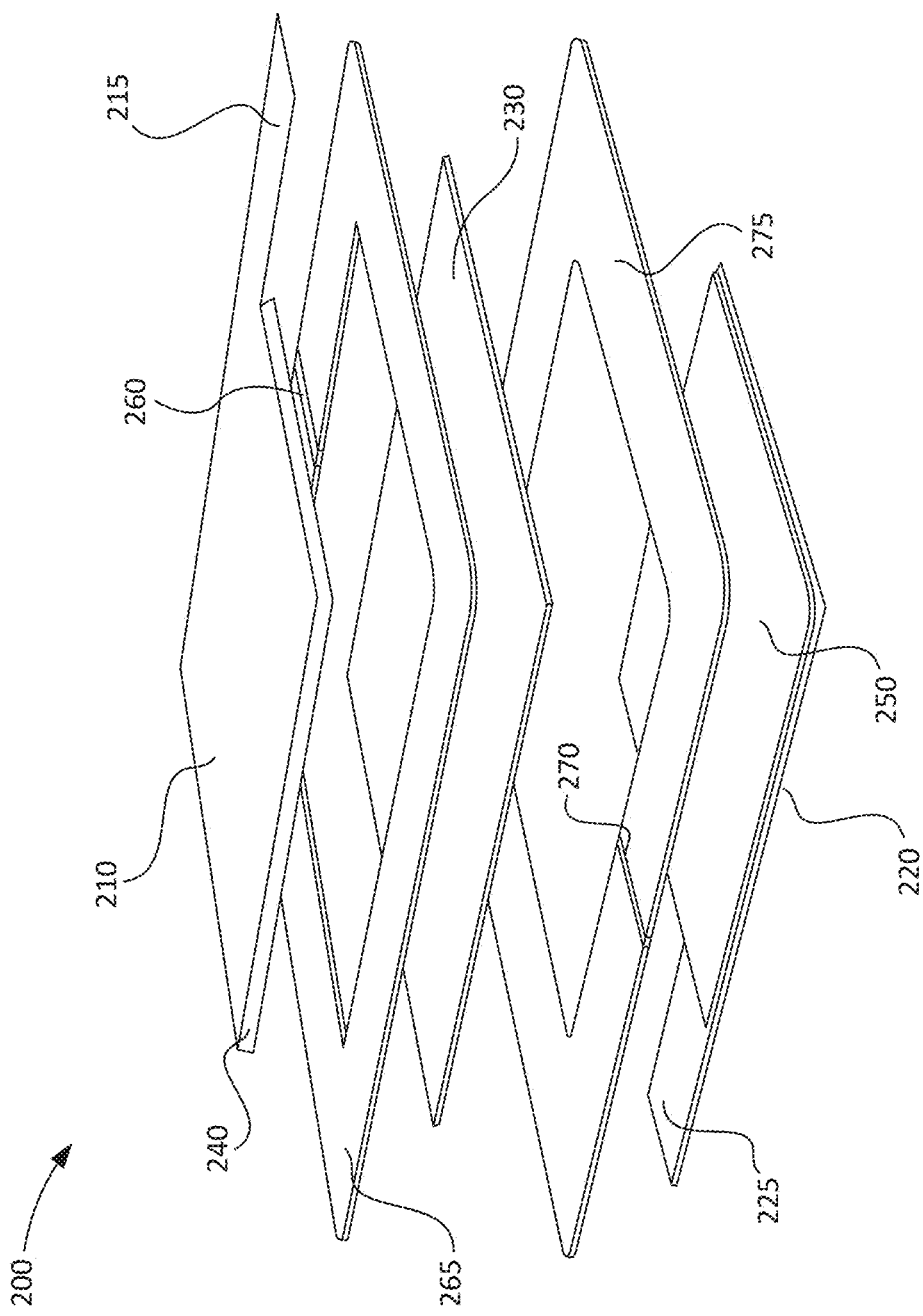
FIG. 2 is an exploded view of the construction of a dual electrolyte electrochemical cell, according to an embodiment.

FIG. 2 is an exploded view of the construction of a dual electrolyte electrochemical cell 200, according to an embodiment. The electrochemical cell 200 includes an anode current collector 210 (which includes an anode weld tab 215), a cathode current collector 220 (which includes a cathode weld tab 225), and a separator 230 disposed between the anode current collector 210 and the cathode current collector 220. An anode 240 is disposed on the anode current collector 210 and a cathode 250 is disposed on the cathode current collector 220. In some embodiments, the anode 240 is fluidically coupled to an anode degassing port 260. In some embodiments, the cathode 250 is fluidically coupled to a cathode degassing port 270. In some embodiments, the separator 230 can extend beyond the cathode 250 and the anode 240. In some embodiments, the edges of the separator 230 can be sealed between an anode seal 265 and a cathode seal 275. In some embodiments, the separator 230 can include a selectively permeable membrane. In some embodiments, the selectively permeable membrane can be sealed between the anode seal 265 and the cathode seal 275.

In some embodiments, the anode seal 265 can be bonded to the anode current collector 210. In some embodiments, the cathode seal 275 can be bonded to the cathode current collector 220. In some embodiments, the anode seal 265 can be bonded to the separator 230. In some embodiments, the anode seal 275 can be bonded to the separator 230. In some embodiments, the bonding of these surfaces to each other can be via methods including, but not limited to heat sealing, vacuum sealing, lamination, adhesive bonding, and/or mechanical fastening. In some embodiments, the bonding of the anode seal 265 and/or cathode seal 275 (collectively referred to as "the electrode seals") to their respective current collectors can be via the same method as the bonding of the electrode seals to the separator 230. In some embodiments, the bonding of the electrode seals to their respective current collectors be via a different method from the bonding of the electrode seals to the separator 230. In some embodiments, the anode degassing port 260 and/or the cathode degassing port 270 can be in the shape of a cylinder (i.e., the degassing ports can each have a circular cross section that extends through the width of their respective electrode seals). In some embodiments, the anode degassing port 260 and/or the cathode degassing port 270 can have the shape of a rectangular prism (i.e., rectangular cross section extending through the width of their respective electrode seals). In some embodiments, the anode degassing port 260 and/or the cathode degassing port 270 can have the shape of a triangular prism.

In some embodiments, the anode seal 265 can contain and provide edge support for the anode 210. In some embodiments, the cathode seal 275 can contain and provide edge support for the cathode 220.

Figure 3:
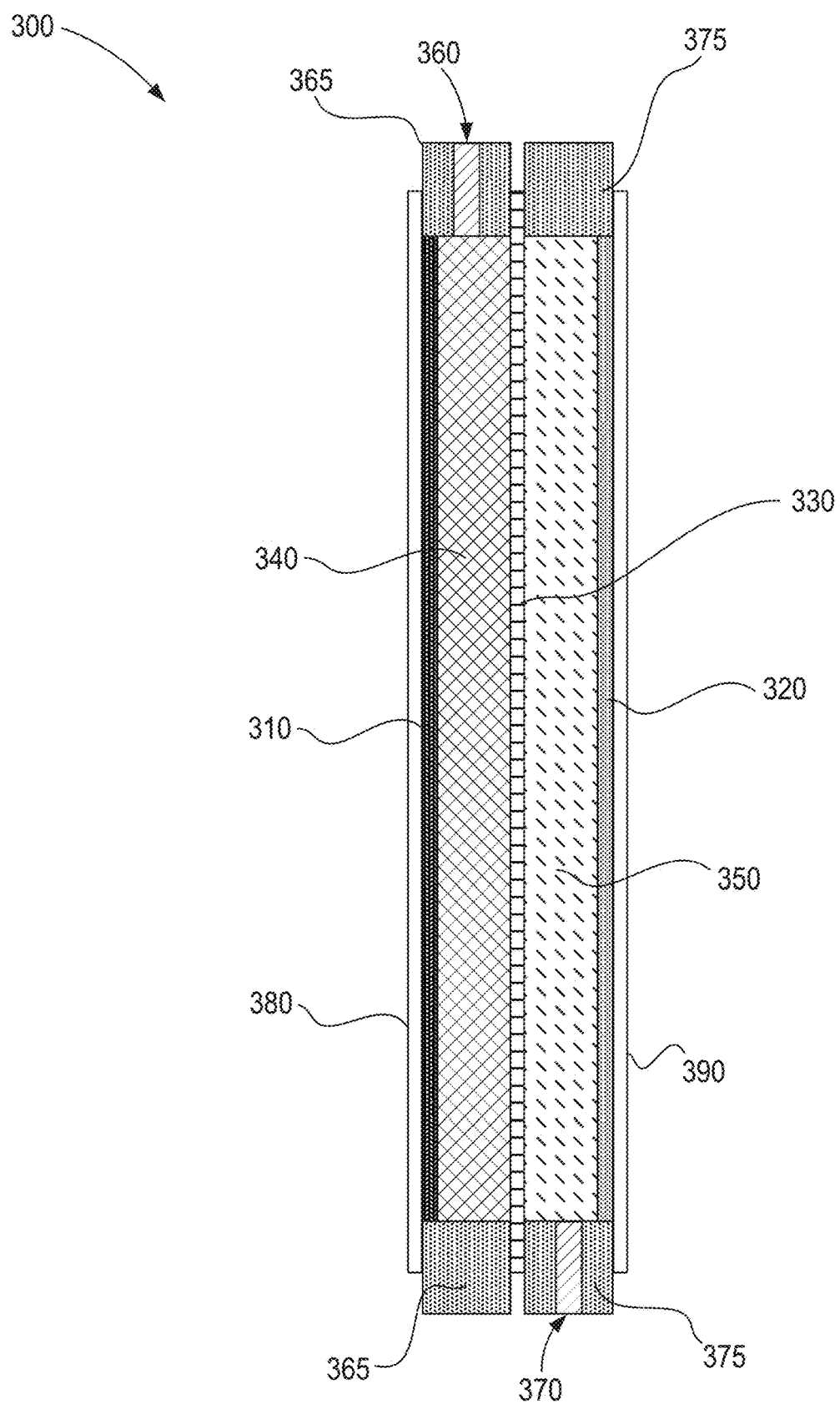
FIG. 3 is a cross-sectional view of a dual electrolyte electrochemical cell, according to an embodiment.

FIG. 3 is a cross-sectional view of a dual electrolyte electrochemical cell 300, according to an embodiment. The electrochemical cell 300 includes an anode current collector 310, a cathode current collector 320, and a separator 330 disposed between the anode current collector 310 and the cathode current collector 320. An anode 340 is disposed between the anode current collector 310 and the separator 330, and a cathode 350 is disposed between the cathode current collector 320 and the separator 330. In some embodiments, the anode 340 can be fluidically coupled to an anode degassing port 360. In some embodiments, the cathode 350 can be fluidically coupled to a cathode degassing port 370. In some embodiments, the separator 330 can extend beyond the cathode 350 and the anode 340. In some embodiments, the edges of the separator 330 can be sealed between an anode seal 365 and a cathode seal 375. In some embodiments, the anode seal 365 and anode current collector 310 can be sealed to an anode plastic film 380. In some embodiments, the cathode seal 375 and cathode current collector 320 can be sealed to a cathode plastic film 390.

In some embodiments, the anode seal 365 can have a thickness substantially equal to the width of the anode degassing port 360. In other words, the width (i.e., the left-to-right dimension in FIG. 3) of the anode degassing port 360 can extend the entire length from the anode 340 to the separator 330. In some embodiments, the anode seal 365 can have a thickness greater than the width of the anode degassing port 360. In other words, the width of the anode degassing port 360 may not extend the entire thickness of the anode seal 365. In some embodiments, width of the anode degassing port 360 can be about 90%, about 80%, about 70%, about 60%, about 50%, or about 40% of the width of the anode seal 365.

In some embodiments, the cathode seal 375 can have a thickness substantially equal to the width of the cathode degassing port 370. In some embodiments, the cathode seal 375 can have a thickness greater than the width of the cathode degassing port 370. In other words, the width of the cathode degassing port 370 may not extend the entire thickness of the cathode seal 375. In some embodiments, width of the cathode degassing port 370 can be about 90%, about 80%, about 70%, about 60%, about 50%, or about 40% of the width of the cathode seal 375.

Figure 4:
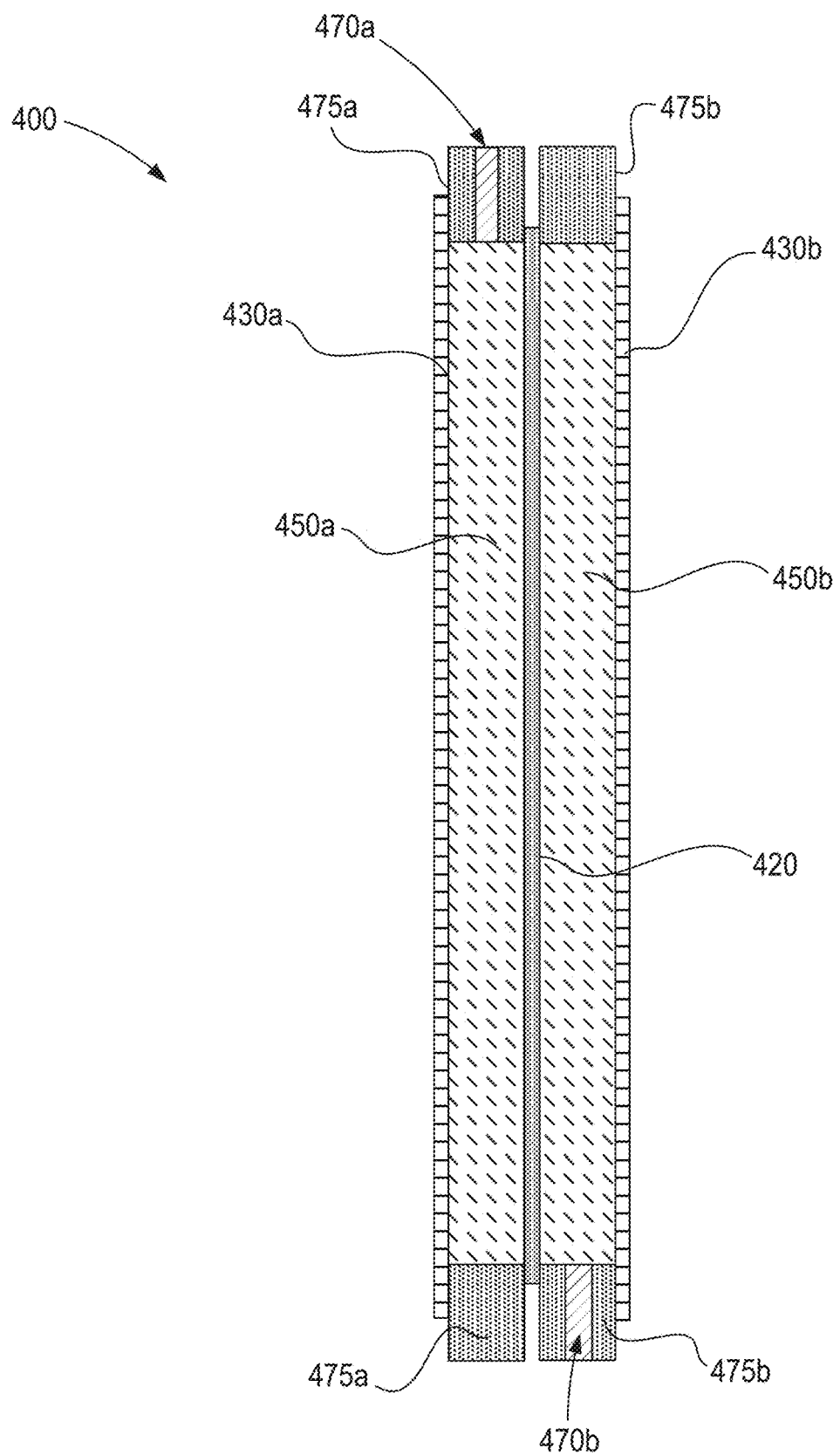
FIG. 4 is a cross-sectional view of the construction of a dual electrolyte electrochemical cell, according to an embodiment.

FIG. 4 is a cross-sectional view of the construction of a double-sided electrode 400, according to an embodiment. The double-sided electrode 400 includes an electrode current collector 420, a first separator 430a and a second separator 430b. A first electrode 450a is disposed between the electrode current collector 420 and the first separator 430a, and a second electrode 450b is disposed between the electrode current collector 420 and the second separator 430b. In some embodiments, the first electrode 450a can be fluidically coupled to a first electrode degassing port 470a. In some embodiments, the second electrode 450b can be fluidically coupled to a second degassing port 470b. In some embodiments, the electrode current collector 420 can extend beyond the electrodes 450. In some embodiments, the edges of the electrode current collector 420 can be sealed to a first electrode seal 475a and a second electrode seal 475b. In some embodiments, the separators 430 can extend beyond the electrodes 450. In some embodiments, the edges of the first separator 430a can be sealed to the first electrode seal 475a and the edges of the second separator 430b can be sealed to the second electrode seal 475b. In some embodiments, the first electrode 450a and the second electrode 450b can be fluidically isolated from each other. In some embodiments, the degassing ports 470 can function substantially similarly and have the same or substantially similar physical properties to the anode degassing port 360 and cathode degassing port 370, as described above with reference to FIG. 3.

In some embodiments, the electrodes 450 can be anodes. In some embodiments, the electrodes 450 can be cathodes. In some embodiments, the electrodes 450 can include a semi-solid cathode material and can substantially encapsulate the cathode current collector 420.

Figure 5:
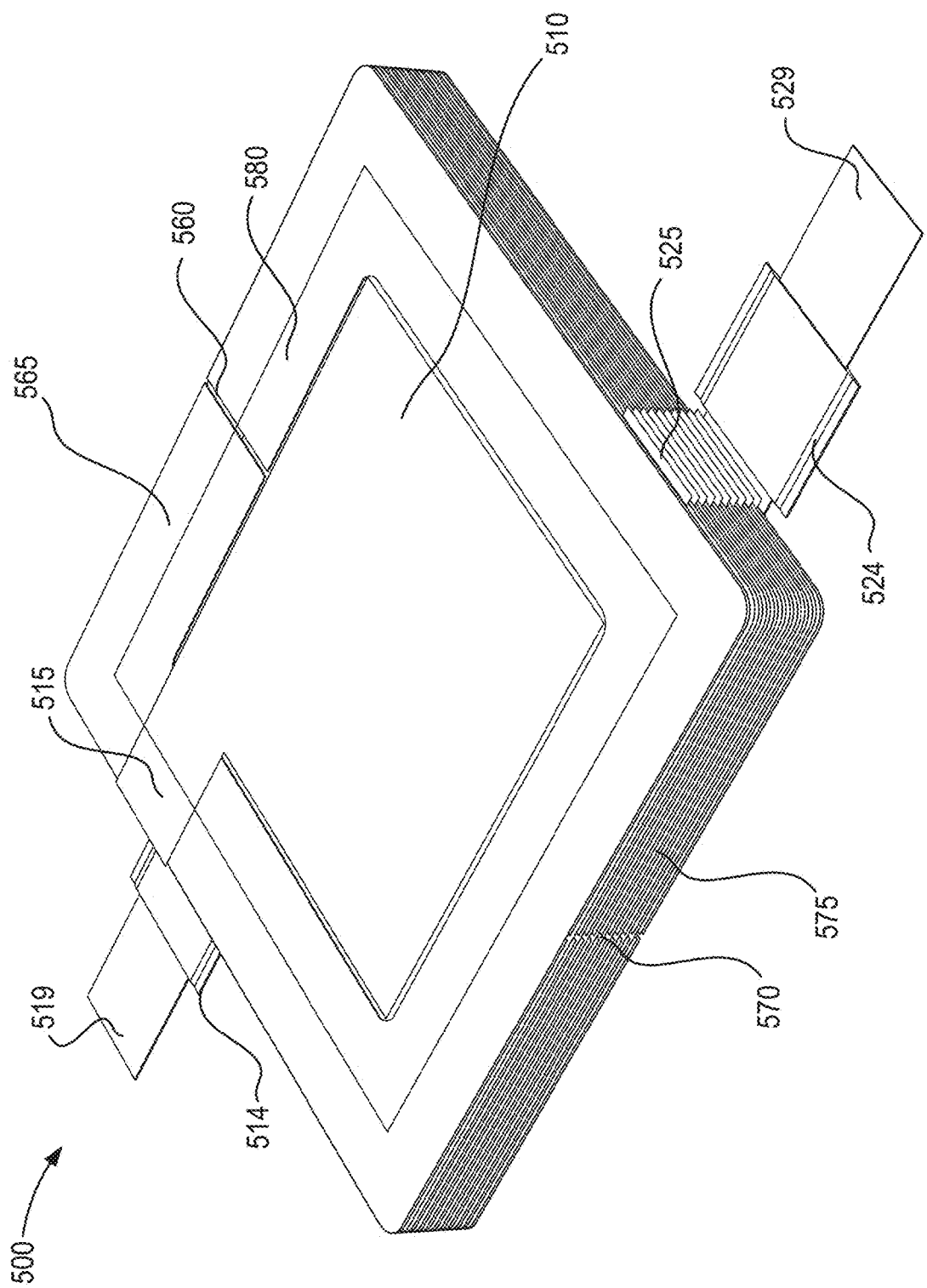
FIG. 5 is a stack of dual electrolyte electrochemical cells, according to an embodiment.

FIG. 5 is an electrochemical cell stack 500, according to an embodiment. In some embodiments, the electrochemical cell stack 500 can comprise a plurality of electrochemical cells. In some embodiments, each of the electrochemical cells can be the same or substantially similar to the electrochemical cell 200, as described above in reference to FIG. 2. Cell components described above in reference to FIG. 2, which are also visible in this depiction include an anode current collector 510, cathode weld tabs 525, anode degassing port 560, anode seal 565, cathode degassing port 570, cathode seal 575, and anode plastic film 580. In addition, the electrochemical cell stack 500 can include an anode busbar 519 (with insulating sleeve 514), and a cathode busbar 529 (with insulating sleeve 524). The anode busbar 519 is electrically coupled to the anode weld tab (not shown) of each cell. The cathode busbar 529 is electrically coupled to the cathode weld tab 525 of each cell. In some embodiments, the anode weld tabs and cathode weld tabs 525 can be on opposite sides of the electrochemical cell stack 500, as depicted in FIG. 5.

In some embodiments, the electrochemical cells stacked to create the electrochemical cell stack 500 can be joined together by various means. Means, by which the electrochemical cells can be joined together include but are not limited to adhesives, mechanical couplings, or lamination. In some embodiments, the electrochemical cell stack 500 can include 2, 3, 4, 5, 6, 7, 8, 9, 10, 11, 12, 13, 14, 15, 16, 17, 18, 19, 20 or more electrochemical cells.

Figure 6:
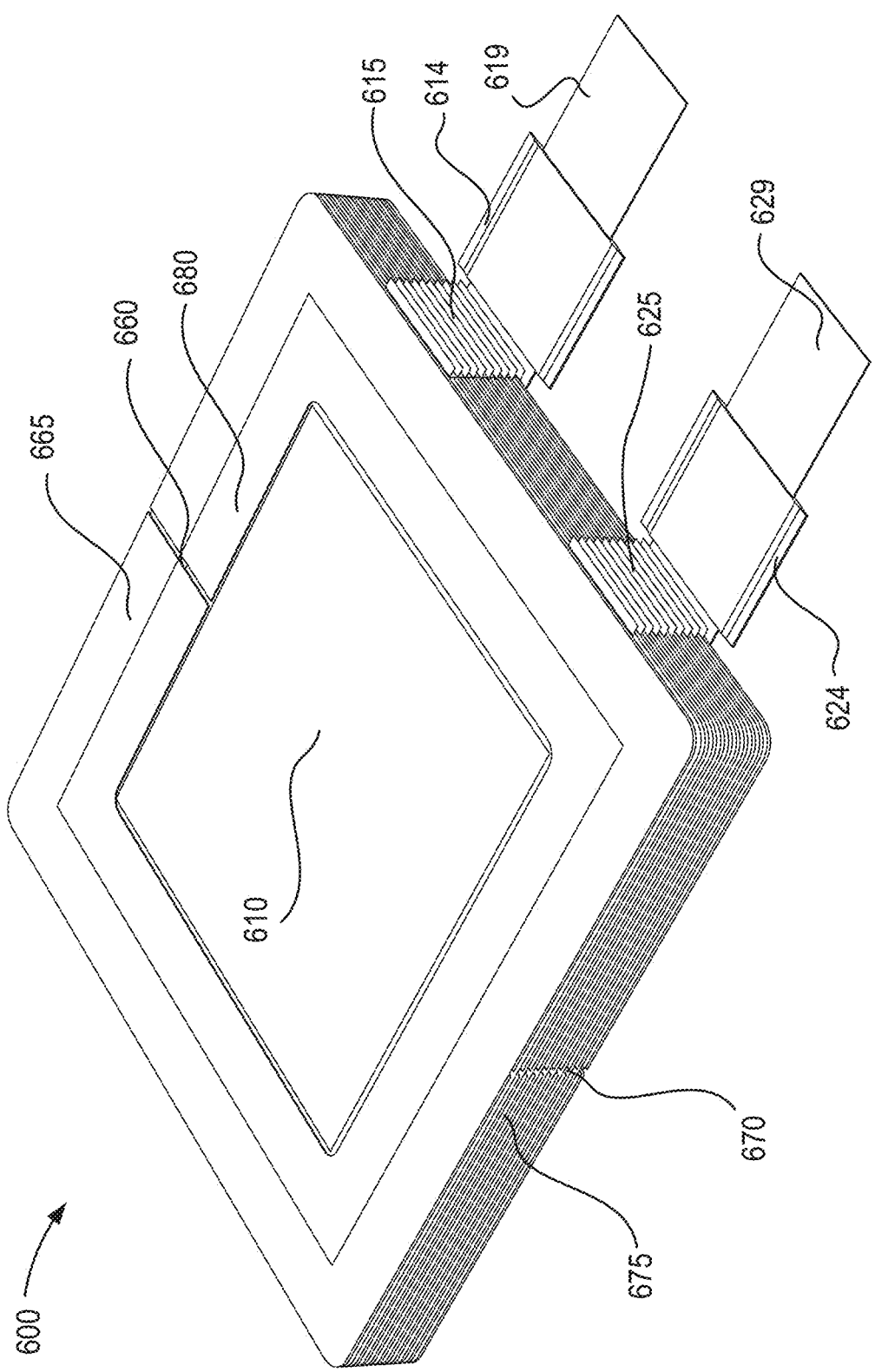
FIG. 6 is a stack of dual electrolyte electrochemical cells, according to an embodiment.

FIG. 6 is an electrochemical cell stack 600, according to an embodiment. In some embodiments, the electrochemical cell stack 600 can comprise a plurality of electrochemical cells. In some embodiments, each of the electrochemical cells can be substantially similar to the electrochemical cell 200, as described above in reference to FIG. 2. Cell components described above in reference to FIG. 2, which are also visible in this depiction include an anode current collector 610, anode weld tabs 615, cathode weld tabs 625, anode degassing port 660, anode seal 665, cathode degassing port 670, cathode seal 675, and anode plastic film 680. In addition, the electrochemical cell stack 600 can include an anode busbar 619 (with insulating sleeve 614), and a cathode busbar 629 (with insulating sleeve 624). The anode busbar 619 is electrically coupled to the anode weld tab 615 of each cell. The cathode busbar 629 is electrically coupled to the cathode weld tab 625 of each cell. In some embodiments, the anode weld tabs 615 and cathode weld tabs 625 can be on the same side of the electrochemical cell stack 600, as depicted in FIG. 6.

In some embodiments, the electrochemical cells stacked to create the electrochemical cell stack 600 can be joined together by various means. Means, by which the electrochemical cells can be joined together include but are not limited to adhesives, mechanical couplings, or lamination. In some embodiments, the electrochemical cell stack 600 can include 2, 3, 4, 5, 6, 7, 8, 9, 10, 11, 12, 13, 14, 15, 16, 17, 18, 19, 20 or more electrochemical cells.

FIGS. 7A-7D illustrate a method of manufacturing a complete dual electrolyte electrochemical cell stack, according to an embodiment. In some embodiments, the electrochemical cell stack 700 in FIG. 7A can be the same or substantially similar to the electrochemical cell stack 500, as described above in reference to FIG. 5. In some embodiments, the electrochemical cell stack 700 in FIG. 7A can be the same or substantially similar to the electrochemical cell stack 600, as described above in reference to FIG. 6. Components of the electrochemical cell stack 700 described above in reference to FIG. 6, which are also visible in this depiction include an anode current collector 710, anode weld tabs 715, cathode weld tabs 725, anode degassing port 760, anode seal 765, cathode degassing port 770, cathode seal 775, anode busbar 719 (with insulating sleeve 714), cathode busbar 729 (with insulating sleeve 714), and anode plastic film 780. In some embodiments, the electrochemical cell stack can be placed on a bottom pouch 747 and a top pouch 748 (which includes stack compartment 745 and degassing compartments 746) can join with the bottom pouch to enclose the electrochemical cell stack 700. In some embodiments, the electrochemical cell stack 700 can be rolled into a cylindrical shape. In some embodiments, the bottom pouch 747 and the top pouch 748 can form a cylindrical shape.

Figure 7B:
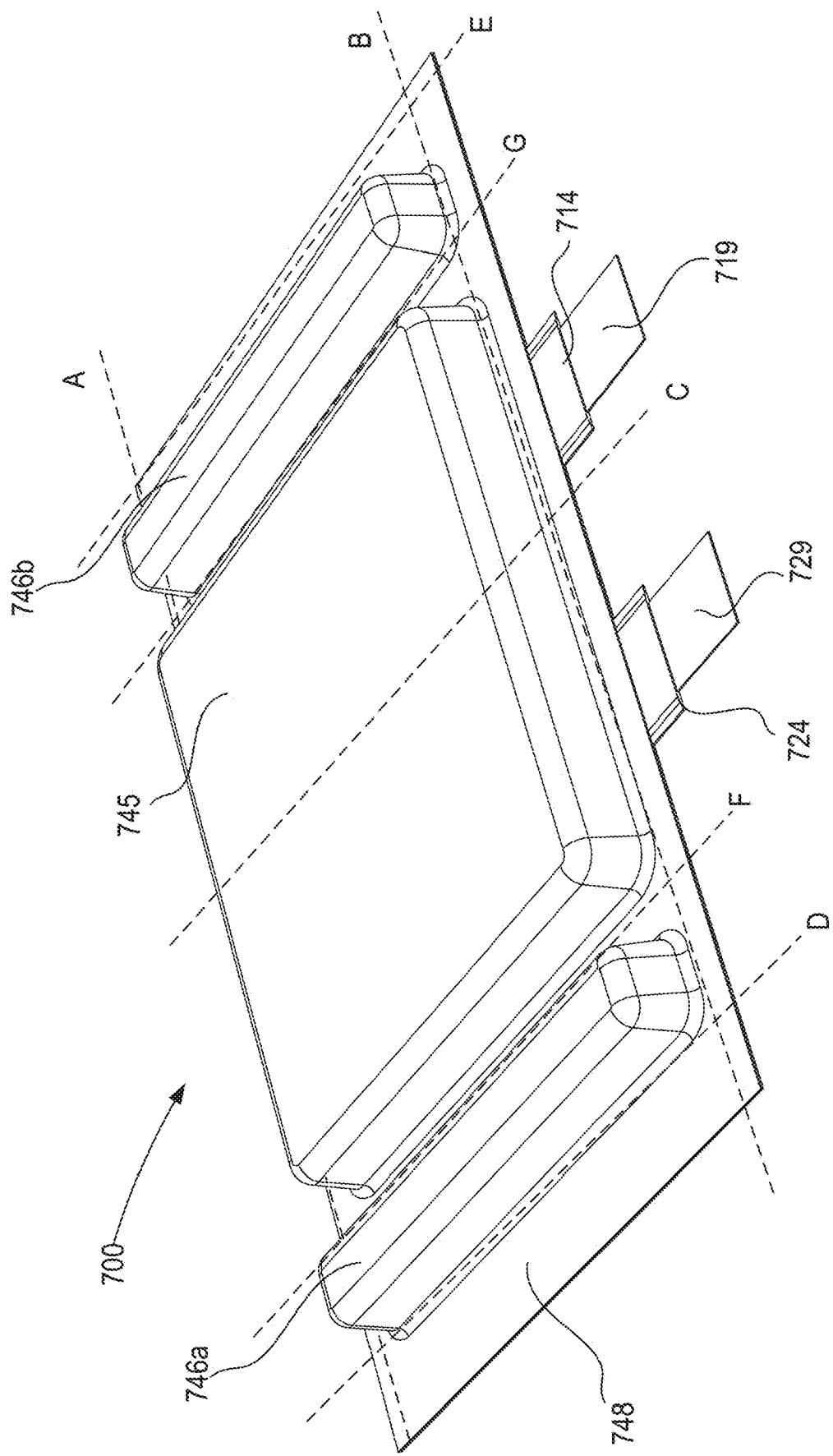

Once the top pouch 748 has joined with the bottom pouch 747, the top pouch 748 and the bottom pouch 747 can be heat sealed along the lines shown in FIG. 7B. Heat sealing can first be performed along lines A, B, and C. In some embodiments, sealing along line C around the entire perimeter of the electrochemical cell stack 700 can fluidically isolate the anode exhaust gas from the cathode exhaust gas, thereby preventing cross-contamination. After heat sealing along lines A, B, and C, a heat seal and vacuum can be applied along lines D and E. This can draw gas out of the anodes and cathodes of the electrochemical cell stack 700 and into the cathode degassing compartment 746*a* and anode degassing compartment 746*b*, while some gas is entirely expelled from the electrochemical cell stack 700. After the heat seal and vacuum have been applied along lines D and E, cutting can be performed along lines F and G, as depicted in FIG. 7C. After cutting along lines F and G, an additional round of degassing and vacuum sealing can be performed along lines F and G to create a completed electrochemical cell stack 700, as depicted in FIG. 7D.

Figure 8:
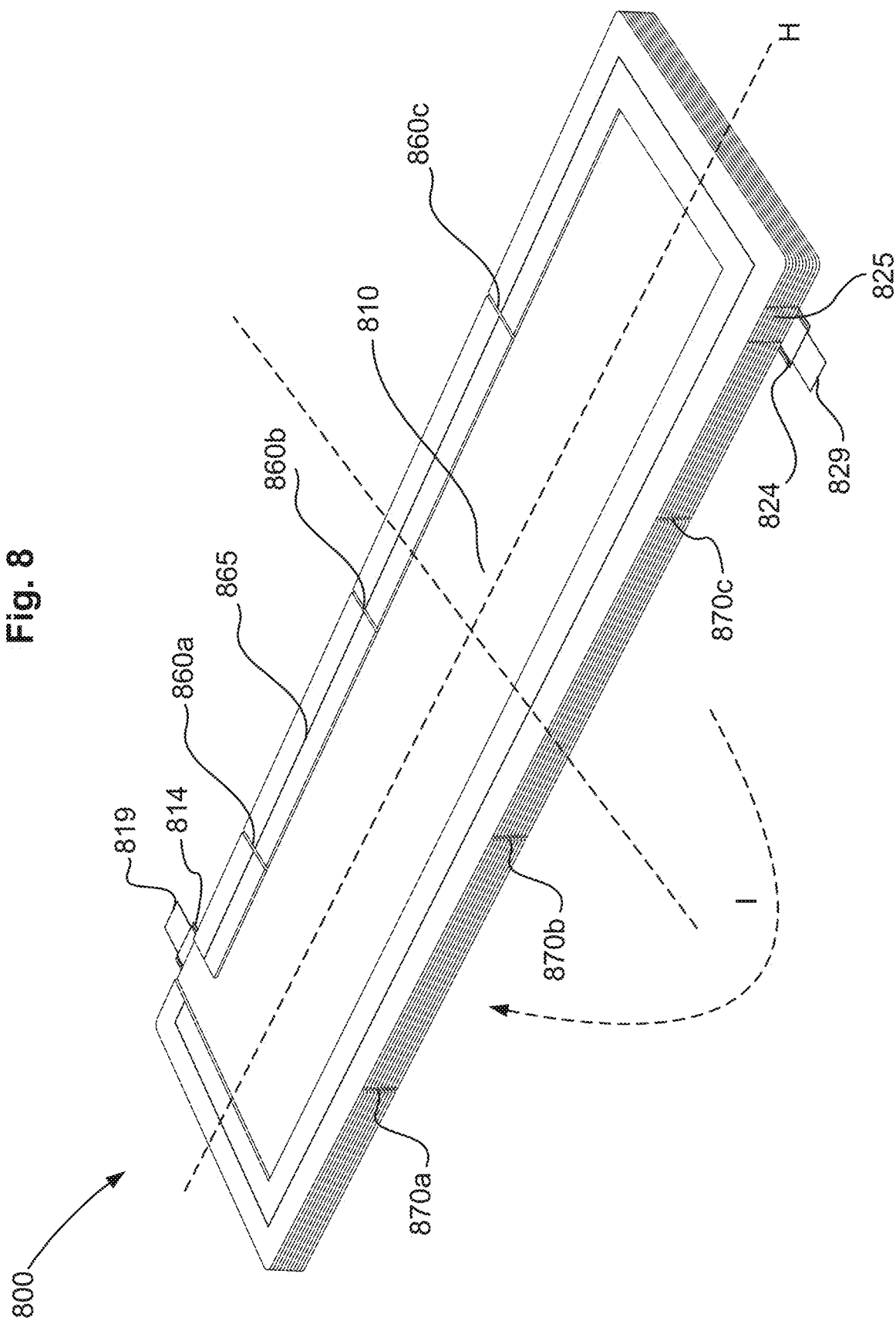
FIG. 8 illustrates stack of dual electrolyte electrochemical cells, according to an embodiment.

FIG. 8 an electrochemical cell stack 800, according to an embodiment. In some embodiments, the electrochemical cell stack 800 can have similar properties to electrochemical cell stack 500, as described above in reference to FIG. 5 or electrochemical cell stack 600, as described above in reference to FIG. 6. In some embodiments, the electrochemical cell stack 800 can have a length and a width, the length being significantly greater than the width. In addition to an anode current collector 810, anode weld tab 815, anode busbar 819 (with insulating sleeve 814), cathode weld tab 825, cathode busbar 829 (with insulating sleeve 824), anode seal 865 and cathode seal 875, the electrochemical cell stack 800 can include multiple anode degassing ports 860 and multiple degassing ports 870. In some embodiments, the electrochemical cell stack 800 can be sealed along line H to fluidically isolate the anode from the cathode. In some embodiments, the elongated dimension of the electrochemical cell stack 800 can be rolled along curve I in order to create a cylindrical rolled electrochemical cell stack. The resulting rolled electrochemical cell stack can be placed into a cylindrical can to create a cylindrical unit comprising a plurality of cells. In some embodiments, the elongated dimension of the electrochemical cell stack 800 can be rolled along curve I in order to create a prismatic electrochemical cell stack. In some embodiments, the electrochemical cells stacked to create the electrochemical cell stack 800 can be joined together by various means. Means, by which the electrochemical cells can be joined together include but are not limited to adhesives, mechanical couplings, or lamination. In some embodiments, the electrochemical cell stack 800 can include 2, 3, 4, 5, 6, 7, 8, 9, 10, 11, 12, 13, 14, 15, 16, 17, 18, 19, 20, or more electrochemical cells.

While various embodiments have been described above, it should be understood that they have been presented by way of example only, and not limitation. For example, while the embodiments herein describe electrochemical devices such as, for example, lithium ion batteries, the systems, methods and principles described herein are applicable to all devices containing electrochemically active media. Said another way, any electrodes and/or devices including at least an active material (source or sink of charge carriers), an electrically conducting additive, and an ionically conducting media (electrolyte) such as, for example, batteries, capacitors, electric double-layer capacitors (e.g., ultracapcitors), pseudo-capacitors, etc., are within the scope of this disclosure. Furthermore, the embodiments can be used with non-aqueous and/or aqueous electrolyte battery chemistries.

Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. Additionally, certain steps may be partially completed and/or omitted before proceeding to subsequent steps.

While various embodiments have been particularly shown and described, various changes in form and details may be made. For example, although various embodiments have been described as having particular features and/or combinations of components, other embodiments are possible having any combination or sub-combination of any features and/or components from any of the embodiments described herein. The specific configurations of the various components can also be varied.

The invention claimed is:
1. A method of degassing an electrochemical cell stack, comprising:
placing an electrochemical cell stack on a bottom pouch, the electrochemical cell stack including a plurality of electrochemical cells, each electrochemical cell comprising an anode, a cathode, an anode degassing port fluidically coupled to the anode, and a cathode degassing port fluidically coupled to the cathode;
joining a top pouch to the bottom pouch to form a cased electrochemical cell stack, the top pouch including a stack compartment and at least two degassing compartments, the stack compartment encasing the electrochemical cell stack;

sealing around a perimeter of the cased electrochemical cell stack to fluidically isolate the anode of each electrochemical cell from the cathode of each electrochemical cell;

applying a vacuum to the cased electrochemical cell stack, the vacuum operable to (a) draw gas from the anode of each electrochemical cell into a first degassing compartment of the at least two degassing compartments, and (b) draw gas from the cathode of each electrochemical cell into a second degassing compartment of the at least two degassing compartments;

applying a seal between each electrochemical cell and the first degassing compartment and between each electrochemical cell and the second degassing compartment; and removing the at least two degassing compartments from the cased electrochemical cell stack to form a degassed electrochemical cell stack.

2. The method of claim 1, further comprising:

rolling the electrochemical cell stack to form into a cylindrical shape.

3. The method of claim 2, wherein the top pouch and the bottom pouch form a cylindrical shape.

4. The method of claim 2, wherein each electrochemical cell includes a plurality of anode degassing ports and a plurality of cathode degassing ports.

5. The method of claim 2, wherein removing the at least two degassing compartments is via cutting.

6. The method of claim 2, wherein each anode degassing port is configured to allow the flow of gas only in a direction from the anode to the first degassing compartment.

7. The method of claim 2, wherein each cathode degassing port is configured to allow the flow of gas only in a direction from the cathode to the second degassing compartment.

8. The method of claim 2, wherein each anode degassing port is integrated into an anode seal, the method further including:

sealing the anode seal between a selectively permeable membrane and at least one of the top pouch or the bottom pouch.

9. A method of forming a degassed electrochemical cell stack, comprising:

stacking a plurality of electrochemical cells on top of a bottom pouch, each of the plurality of electrochemical cells including an anode disposed on an anode current collector, a cathode disposed on a cathode current collector, a selectively permeable membrane disposed between the anode and the cathode, an anode tab extending from the anode current collector, a cathode tab extending from the cathode current collector, an anode degassing port configured to release gas from the anode, and a cathode degassing port configured to release gas from the cathode;

electrically coupling an anode busbar to each anode tab;
electrically coupling a cathode busbar to each cathode tab;
joining a top pouch to the bottom pouch to form a cased electrochemical cell stack, the cased electrochemical cell stack including a first compartment housing the degassed electrochemical cell stack, a second compartment fluidically coupled to each of the anode degassing ports, and a third compartment fluidically coupled to each of the cathode degassing ports, the anode busbar and the cathode busbar each protruding from the first compartment;

applying a vacuum to the cased electrochemical cell stack, such that a first gas transfers from the anodes to the second compartment and a second gas transfers from the cathodes to the third compartment;

sealing an area between each electrochemical cell and the second compartment and an area between each electrochemical cell and the third compartment; and removing the second compartment and the third compartment from the cased electrochemical cell stack to form a degassed electrochemical cell stack.

10. The method of claim 9, further comprising:

rolling the plurality of electrochemical cells to form into a cylindrical shape.

11. The method of claim 9, wherein the top pouch and the bottom pouch form a cylindrical shape.

12. The method of claim 9, wherein each of the anode degassing ports are incorporated into an anode seal, the anode seal bonded to the selectively permeable membrane.

13. The method of claim 9, wherein each of the cathode degassing ports are incorporated into a cathode seal, the cathode seal bonded to the selectively permeable membrane.

14. The method of claim 9, wherein each anode degassing port is configured to allow the flow of gas only in a direction from the anode to the second compartment.

15. The method of claim 9, wherein each cathode degassing port is configured to allow the flow of gas only in a direction from the cathode to the third compartment.

16. The method of claim 9, wherein:

joining the top pouch to the bottom pouch includes contacting the top pouch with a first insulating sleeve disposed around the anode busbar and a second insulating sleeve disposed around the cathode busbar; and forming a seal around the first insulating sleeve and the second insulating sleeve.

17. A method of degassing an electrochemical cell stack, comprising:

placing an electrochemical cell stack on a bottom pouch, the electrochemical cell stack including a plurality of electrochemical cells, each electrochemical cell comprising an anode, a cathode fluidically isolated from the anode via a selectively permeable membrane, an anode degassing port fluidically coupled to the anode, a cathode degassing port fluidically coupled to the cathode, an anode tab electronically coupled to the anode, and a cathode tab electronically coupled to the cathode;

joining a top pouch to the bottom pouch to form a cased electrochemical cell stack, the cased electrochemical cell stack including a first compartment housing the electrochemical cell stack, a second compartment, and a third compartment;

sealing around a perimeter of the cased electrochemical cell stack to fluidically isolate the anode of each electrochemical cell from the cathode of each electrochemical cell;

applying a vacuum to the cased electrochemical cell, the vacuum operable to transfer a first gas from each of the anodes to the second compartment via the anode degassing ports and transfer a second gas from each of the cathodes to the third compartment via the cathode degassing ports;

sealing an area between each electrochemical cell and the second compartment and an area between each electrochemical cell and the third compartment; and cutting the second compartment and the third compartment to remove the second compartment and the third compartment from the cased electrochemical cell stack to form a degassed electrochemical cell stack.

18. The method of claim 17, wherein each anode degassing port is configured to allow the flow of gas only in a direction from the anode to the second compartment.

19. The method of claim 17, wherein each cathode degassing port is configured to allow the flow of gas only in a direction from the cathode to the third compartment.

20. The method of claim 17, wherein each of the anode degassing ports are incorporated into an anode seal, the anode seal bonded to the selectively permeable membrane.

21. The method of claim 17, wherein each of the cathode degassing ports are incorporated into a cathode seal, the cathode seal bonded to the selectively permeable membrane.

22. The method of claim 17, further comprising:
   rolling the plurality of electrochemical cells to form into a cylindrical shape.

* * * * *